United States Patent [19]

Yang et al.

[11] 4,117,085

[45] Sep. 26, 1978

[54] TREATMENT OF ALUMINA TO REDUCE DISCOLORATION

[75] Inventors: Kang Yang; John F. Scamehorn, both of Ponca City, Okla.

[73] Assignee: Continental Oil Company, Ponca City, Okla.

[21] Appl. No.: 807,857

[22] Filed: Jun. 20, 1977

[51] Int. Cl.$^2$ ................................................ C01F 7/02
[52] U.S. Cl. .................................... 423/264; 423/265; 423/630
[58] Field of Search ................ 423/625, 630, 264, 265

[56] References Cited

U.S. PATENT DOCUMENTS

| | | | |
|---|---|---|---|
| 3,226,332 | 12/1965 | Lincoln et al. | 252/184 |
| 3,630,674 | 12/1971 | Davidson | 423/264 |
| 3,925,257 | 12/1975 | Horzepa et al. | 423/625 |
| 3,944,658 | 3/1976 | Yoldas | 423/625 |

Primary Examiner—Herbert T. Carter
Attorney, Agent, or Firm—Bayless E. Rutherford, Jr.

[57] ABSTRACT

A method of reducing discoloration of alumina which is caused by exposure of said alumina to high temperatures is disclosed. The method comprises adding an effective amount of an inorganic oxidizing agent (e.g. $H_2O_2$ or NaOCl) to the alumina prior to exposing it to the high temperature.

3 Claims, No Drawings

TREATMENT OF ALUMINA TO REDUCE DISCOLORATION

FIELD OF THE INVENTION

The invention is in the field of discoloration of alumina wherein the discoloration is caused by exposure of the alumina to high temperatures.

BACKGROUND

One means of preparing a high-quality alumina is water hydrolysis of aluminum alkoxides. A convenient way of preparing the aluminum alkoxides involves preparing a mixture of high-molecular weight trialkyl aluminum by adding ethylene to triethyl aluminum (the well-known Ziegler process). The trialkyl aluminum is then oxidized to the corresponding aluminum alkoxides.

After removal of the alcohols resulting from the process the alumina is present in a slurry of water and alumina. A convenient means of removing the water from the slurry is by means of a spray dryer. Unfortunately, operating the spray dryer at high temperatures, as defined hereinafter, produces a discoloration of the alumina.

Similarly, maintaining the alumina at high temperatures, after drying and prior to bagging and shipping, results in a discoloration of the alumina.

We have found that addition of an inorganic oxidizing agent to the slurry, or to the alumina, as the case may be, substantially reduces this discoloration.

PRIOR ART STATEMENT

From a search of the prior art, the most pertinent references are believed to be the following:

U.S. Pat. No. 3,562,150 teaches removal of contaminants from metal-coated catalysts used in desulfurization processes. The support for the catalyst is alumina. The process includes the step of treating the alumina-supported catalyst with hydrogen peroxide.

U.S. Pat. No. 3,630,351 teaches a process for separating alumina from the siliceous material contained in alumina-bearing sand. The process includes the step of slurrying the sand with water and sodium hypochlorite.

Applicants' invention is believed patentable over these references since the references do not treat alumina per se with the oxidizing agent. Further, the references are concerned with solving a different problem than that of Applicants' invention.

BRIEF SUMMARY OF THE INVENTION

Briefly stated, the present invention is directed to a method of reducing discoloration of alumina, said discoloration being due to exposure to high temperatures, wherein the method comprises adding an effective amount of an inorganic oxidizing agent to the alumina prior to the exposure thereof to high temperatures.

In one aspect, the invention is directed to an improvement in the method of removing water from an alumina-water slurry by drying at a temperature above 127° C., wherein the improvement comprises adding an effective amount of an inorganic oxidizing agent to the alumina-water slurry prior to the drying.

In another aspect, the invention is directed to an improvement in the method of storing and transporting alumina wherein the alumina is at a temperature of above 100° C. for 1 hour or longer wherein the improvement comprises adding an effective amount of an inorganic oxidizing agent to the alumina prior to storage and transport at a temperature of above 100° C. for 1 hour or longer.

DETAILED DESCRIPTION

Applicants' invention is restricted to alumina prepared by the hydrolysis of aluminum alkoxides.

As mentioned previously, Applicants' invention is directed to two aspects. The first aspect involves removing water from an alumina-water slurry by drying (spray drying, drum drying, etc.) at a high temperature. In this aspect the term high temperature refers to a temperature of above 127° C.

The second aspect involves storage and transporting alumina at a temperature which is lower than in the first aspect but for a longer period of time. In this aspect the term high temperature refers to a temperature of above 100° C. The alumina in this aspect will contain less than 40 weight percent water, usually less than 30 weight percent water. While these values may seem high, it should be mentioned that commercial alumina usually contains 25 to 30 weight percent water, including water of hydration.

It should be noted that in the first aspect the alumina is at the high temperature for only a few seconds (e.g. 10 to 60 seconds) whereas in the second aspect the alumina is at the high temperature for a longer period of time (e.g. 1 to 200 hours).

The alumina-water slurry will usually contain about 3 to about 30 weight percent alumina. More usually, it will contain about 8 to about 12 weight percent alumina.

Our invention is restricted to the use of inorganic oxidizing agents. Examples of suitable inorganic oxidizing agents include alkali metal salts of the oxygen compounds of the halogens, peroxides, perborates, permanganates and ozones, and hydrogen peroxide. Examples of suitable oxidizing agents include sodium hypochlorite, potassium hypochlorite, sodium perchlorate, potassium perchlorate, sodium peroxide, sodium perborate, potassium permanganate, hydrogen peroxide, sodium peroxide, and ozone. The preferred oxidizing agents are hydrogen peroxide and sodium hypochlorite.

The amounts of inorganic oxidizing agent which are used in our process, are shown below for both suitable and preferred ranges. The units are grams of oxidizing agent per gram of alumina,

| Suitable | Preferred |
| --- | --- |
| $1 \times 10^{-6} - 0.5$ | $1 \times 10^{-4} - 0.1$ |

In order to illustrate the nature of the present invention still more clearly the following examples will be given. It is to be understood, however, that the invention is not to be limited to the specific conditions or details set forth in these examples except insofar as such limitations are specified in the appended claims.

In the examples all color readings were obtained using a Gardner XL-10A tristimulus colorimeter. Two values are used. The parameter $b_L$ increases as the yellowness of the sample increases. Conversely $b_L$ decreases as the yellowness decreases. The parameter L increases as the whiteness of the sample increases.

EXAMPLE 1

This example shows the effect of sodium hypochlorite on alumina, heated at 132° C. Several runs were made with varying concentrations of NaOCl. The designated amount of NaOCl in water was added to the alumina, after which the alumina was dried at 110° C. for 12 hours. The samples were then placed in an oven, maintained at 132° C. for 24 hours. The concentration of NaOCl, $b_L$ and L values are shown in the following table.

| Conc. g/g alumina | $b_L$ | L |
|---|---|---|
| 0 (Untreated) | 8.0 | 93.8 |
| $5.3 \times 10^{-6}$ | 6.8 | 94.1 |
| $1.5 \times 10^{-5}$ | 6.5 | 94.1 |
| $2.7 \times 10^{-5}$ | 6.4 | 94.2 |
| $5.1 \times 10^{-5}$ | 6.4 | 94.1 |
| $2.7 \times 10^{-4}$ | 6.3 | 94.1 |
| $1.0 \times 10^{-3}$ | 4.9 | 94.5 |
| $2.7 \times 10^{-3}$ | 4.2 | 95.0 |
| $1.8 \times 10^{-2}$ | 3.7 | 96.1 |
| $2.7 \times 10^{-2}$ | 1.9 | 97.4 |
| $5.1 \times 10^{-2}$ | 2.0 | 97.2 |

EXAMPLE 2

This example illustrates effect of using sodium hypochlorite in a spray drying run. The drying conditions were 427° C. inlet air temperature, 21° C. inlet slurry temperature, slurry weight percent solids of 10 percent, about 250 SCFM air rate, 177°–182° C. outlet temperature and 20,000 RPM atomizer wheel speed. The dryer used was a NIRO utility spray dryer with a 4 foot diameter and about a 8 foot chamber length. The colors on standard alumina and one with 0.0263 g NaOCl/g alumina added to the alumina are shown below.

|  | $b_L$ | L |
|---|---|---|
| Standard alumina | 10.2 | 91.8 |
| Alumina with NaOCl | 7.9 | 92.8 |

EXAMPLE 3

This example shows the effect of hyrogen peroxide on alumina heated at 132° C. The procedure was the same as in Example 1. The concentration of $H_2O_2$, $b_L$ and L values are shown in the following table.

| Conc. g/g alumina | $b_L$ | L |
|---|---|---|
| 0 (Untreated) | 8.4 | 93.8 |
| $5.7 \times 10^{-3}$ | 5.9 | 9.41 |
| $1.5 \times 10^{-2}$ | 5.4 | 94.2 |
| $2.3 \times 10^{-2}$ | 5.3 | 95.0 |
| $5.7 \times 10^{-2}$ | 4.7 | 95.2 |
| $1.5 \times 10^{-1}$ | 4.5 | 95.2 |
| $2.7 \times 10^{-1}$ | 4.5 | 95.3 |

EXAMPLE 4

This example illustrates the effect of using hydrogen peroxide in a spray drying run.

The apparatus and conditions were the same as in Example 2, except for amount of oxidizing agent. The amount of hydrogen peroxide was 0.15 g per gram of alumina. The colors on standard alumina and on the treated alumina are shown below.

|  | $b_L$ | L |
|---|---|---|
| Standard alumina | 10.2 | 91.8 |
| Alumina with $H_2O_2$ | 4.7 | 95.9 |

Thus, having described the invention in detail, it will be understood by those skilled in the art that certain variations and modifications may be made without departing from the spirit and scope of the invention as defined herein and in the appended claims.

We claim:

1. A method for reducing discoloration of alumina, said alumina having been prepared by water hydrolysis of aluminum alkoxides, said discoloration being due to exposure to high temperatures, said method comprising adding an effective amount, in the range of about $1 \times 10^{-6}$ to about 0.5 gram per gram of alumina, of hydrogen peroxide to the alumina after hydrolysis and prior to the exposure thereof to high temperatures, said term high temperatures referring to a temperature above 127° C. when the alumina is present in an alumina-water slurry containing at least 3 percent alumina and to a temperature of above 100° C. when the alumina contains less than about 40 weight percent water.

2. In the method of removing water from an alumina-water slurry, said slurry containing at least 3 weight percent alumina, said alumina having been prepared by water hydrolysis of aluminum alkoxides, by drying at a temperature above 127° C., the improvement which comprises adding an effective amount to reduce discoloration of said alumina, in the range of about $1 \times 10^{-6}$ to about 0.5 gram per gram of alumina, of hydrogen peroxide to the alumina-water slurry after hydrolysis and prior to the drying.

3. In the method of storing and transporting alumina, wherein the alumina is at a temperature of above 100° C. for at least 1 hour, said alumina having been prepared by water hydrolysis of aluminum alkoxides and containing less than about 40 weight percent water, the improvement which comprises adding an effective amount to reduce discoloration of said alumina, in the range of about $1 \times 10^{-6}$ to about 0.5 gram per gram of alumina, of hydrogen peroxide to the alumina after hydrolysis and prior to storage and transport at said temperature.

* * * * *